United States Patent
Challener

(10) Patent No.: US 7,027,700 B2
(45) Date of Patent: Apr. 11, 2006

(54) PLANAR WAVEGUIDE FOR HEAT ASSISTED MAGNETIC RECORDING

(75) Inventor: William Albert Challener, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 209 days.

(21) Appl. No.: 10/391,673

(22) Filed: Mar. 19, 2003

(65) Prior Publication Data
US 2004/0062503 A1  Apr. 1, 2004

Related U.S. Application Data

(60) Provisional application No. 60/414,820, filed on Sep. 30, 2002.

(51) Int. Cl.
*G02B 6/10* (2006.01)

(52) U.S. Cl. .................. 385/129; 385/130; 385/131; 385/132

(58) Field of Classification Search ........ 385/129–132, 385/14; 369/112.17
See application file for complete search history.

(56) References Cited

U.S. PATENT DOCUMENTS

| 4,466,004 A | 8/1984 | Kobayashi et al. |
| 4,765,705 A | 8/1988 | Seymour et al. |
| 4,983,002 A | 1/1991 | Shikama et al. |
| 4,991,919 A | 2/1991 | Nishiwaki et al. |
| 5,078,513 A | 1/1992 | Spaulding et al. |
| 5,199,090 A | 3/1993 | Bell |
| 5,286,971 A * | 2/1994 | Betzig et al. .......... 250/227.26 |
| 5,288,998 A | 2/1994 | Betzig et al. |
| 5,647,030 A | 7/1997 | Jorgenson et al. |
| 5,889,641 A | 3/1999 | Belser et al. |
| 5,930,434 A * | 7/1999 | Mowry et al. .......... 385/124 |
| 5,986,978 A | 11/1999 | Rottmayer et al. |
| 6,016,290 A | 1/2000 | Chen et al. |

(Continued)

FOREIGN PATENT DOCUMENTS

JP  2000173093  6/2000

(Continued)

OTHER PUBLICATIONS

R. Coehoorn et al., "Hybrid Recording," Published in "Magnetic Storage Systems Beyond 2000", *Proceedings of the NATO-ASI on Rhodes (Greece)*, Jun. 2000, pp. 1-17.

(Continued)

*Primary Examiner*—Jennifer Doan
(74) *Attorney, Agent, or Firm*—Robert P. Lenart, Esq.; Pietragallo, Bosick & Gordon LLP

(57) ABSTRACT

Recording heads are provided that comprise a magnetic write pole, and a planar waveguide positioned adjacent to the magnetic write pole, the planar waveguide including a first metal layer, a second metal layer, a first optical layer positioned between the first and second metal layers, and a second optical layer for coupling an electromagnetic wave to the first optical layer at a resonant incident angle. The second optical layer for coupling an electromagnetic wave to the first optical layer at a resonant incident angle is positioned adjacent to a surface of the second metal layer opposite the first optical layer and/or a diffraction grating. A mode index lens can also be provided for confining the electromagnetic wave in a direction parallel to the plane of the first optical layer. Disc drives incorporating the recording heads and a method of magnetic recording performed by the recording heads are also disclosed.

24 Claims, 10 Drawing Sheets

U.S. PATENT DOCUMENTS

| | | |
|---|---|---|
| 6,031,945 A * | 2/2000 | You et al. .................... 385/14 |
| 6,043,940 A * | 3/2000 | Kamiyama et al. ......... 359/719 |
| 6,236,514 B1 | 5/2001 | Sato |
| 6,298,027 B1 | 10/2001 | Wilde et al. |
| 6,304,522 B1 | 10/2001 | Valet et al. |
| 6,307,827 B1 | 10/2001 | Nishiwaki |
| 6,343,171 B1 | 1/2002 | Yoshimura et al. |
| 6,404,706 B1 | 6/2002 | Stovall et al. |
| 6,414,911 B1 | 7/2002 | Wilde et al. |
| 6,795,630 B1 * | 9/2004 | Challener et al. .......... 385/129 |
| 6,845,184 B1 * | 1/2005 | Yoshimura et al. ........... 385/14 |
| 2001/0017820 A1 | 8/2001 | Akiyama et al. |
| 2001/0021211 A1 | 9/2001 | Ueyanagi |
| 2002/0122376 A1 | 9/2002 | Song |

FOREIGN PATENT DOCUMENTS

| | | |
|---|---|---|
| WO | WO 01/97214 A2 | 12/2001 |
| WO | WO 03/060882 A1 | 7/2003 |

OTHER PUBLICATIONS

T. E. Schlesinger et al., "An Integrated Read/Write Head for Hybrid Recording," *Jpn. J. Appl. Phys.,* vol. 41, Part 1, No. 3B, Mar. 2002, pp. 1821-1824.

T. Rausch et al., "Near Field Hybrid Recording With a Mode Index Waveguide Lens," pp. 1-6.

W. Challener et al., "Light Delivery for Heat Assisted Magnetic Recording," *IEEE,* Jul. 7, 2002, pp. 159-161.

*Patent Abstracts of Japan,* vol. 2000, No. 09, Oct. 13, 2000 & JP 2000 173093 A (Hitachi Ltd.), Jun. 23, 2000.

* cited by examiner

PLANAR WAVEGUIDE FOR HEAT ASSISTED MAGNETIC RECORDING

CROSS REFERENCE TO RELATED APPLICATION

This application claims the benefit of U.S. Provisional Patent Application Ser. No. 60/414,820, filed Sep. 30, 2002.

STATEMENT REGARDING FEDERALLY SPONSORED RESEARCH OR DEVELOPMENT

This invention was made with the United States Government support under Agreement No. 70NANB1H3056 awarded by the National Institute of Standards and Technology (NIST). The United States Government has certain rights in the invention.

FIELD OF THE INVENTION

This invention relates to optical waveguides, and more particularly to optical waveguides that can be used in heat assisted magnetic recording.

BACKGROUND OF THE INVENTION

Magnetic recording heads have utility in magnetic disc drive storage systems. Most magnetic recording heads used in such systems today are "longitudinal" magnetic recording heads. Longitudinal magnetic recording in its conventional form has been projected to suffer from superparamagnetic instabilities at high bit densities.

Superparamagnetic instabilities become an issue as the grain volume is reduced in order to control media noise for high areal density recording. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is absolute temperature. When this inequality is not satisfied, thermal energy can demagnetize the stored data bits. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, with the available materials the recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information. Heat assisted magnetic recording allows for the use of small grain media, which is desirable for recording at increased areal densities, with a larger magnetic anisotropy at room temperature to assure a sufficient thermal stability. Heat assisted magnetic recording can be applied to any type of magnetic storage media, including tilted media, longitudinal media, perpendicular media and patterned media.

It is believed that reducing or changing the bit cell aspect ratio will extend the bit density limit. However, different approaches will likely be necessary to overcome the limitations of longitudinal magnetic recording.

An alternative to longitudinal recording that overcomes at least some of the problems associated with the superparamagnetic effect is "perpendicular" magnetic recording. Perpendicular magnetic recording is believed to have the capability of extending recording densities well beyond the limits of longitudinal magnetic recording. Perpendicular magnetic recording heads for use with a perpendicular magnetic storage medium may include a pair of magnetically coupled poles, including a main write pole having a relatively small bottom surface area and a flux return pole having a larger bottom surface area. A coil having a plurality of turns is located adjacent to the main write pole for inducing a magnetic field between the pole and a soft underlayer of the storage media. The soft underlayer is located below the hard magnetic recording layer of the storage media and enhances the amplitude of the field produced by the main pole. This, in turn, allows the use of storage media with higher coercive force, consequently, more stable bits can be stored in the media. In the recording process, an electrical current in the coil energizes the main pole, which produces a magnetic field. The image of this field is produced in the soft underlayer to enhance the field strength produced in the magnetic media. The flux density that diverges from the tip into the soft underlayer returns through the return flux pole. The return pole is located sufficiently far apart from the main write pole such that the interaction of the magnetic flux from the main write pole with the magnetic material of the return pole is negligible. The magnetic flux from the main write pole is directed vertically into the hard layer and the soft underlayer of the storage media.

When applying a heat or light source to the medium, it is desirable to confine the heat or light to the track where writing is taking place and to generate the write field in close proximity to where the medium is heated to accomplish high areal density recording. In addition, for heat assisted magnetic recording (HAMR) one of the technological hurdles to overcome is to provide an efficient technique for delivering large amounts of light power to the recording medium confined to spots of, for example, 50 nm or less. A variety of transducer designs have been proposed and some have been experimentally tested. Among those are metal-coated glass fibers and hollow pyramidal structures with metal walls. For all these approaches, confinement of the light depends on an aperture which is fabricated into the end of structure and which gives this kind of transducer the name "aperture probes." Generally these devices suffer from very low light transmission rendering the devices useless for HAMR recording. For example, tapered and metallized optical fibers have demonstrated light confinement down to approximately 50 nm with a throughput efficiency of $10^{-6}$. Pyramidal probes made from anisotropic etching of Si wafers have been designed with throughput efficiencies of $10^{-4}$ for similar spot sizes. Although this is the state of the art, it is still about two orders of magnitude too small for HAMR.

Improvements in throughput efficiency have been achieved for these transducers by changing the taper angles, filling the hollow structures with high index materials, and by trying to launch surface plasmons (SP) on integrated edges and corners of these tip-like structures. Although doing so does increase the throughput to some extent, the most promising SP approach is still very inefficient due to a lack of an efficient SP launching technique. In addition, all aperture probes suffer from a lower limit on spot size which is twice the skin depth of the metal film used to form the aperture. Even for aluminum, the metal with the smallest skin depth for visible light, this corresponds to a spot size of ~20 nm.

Accordingly, there is a need for devices that can provide a reduced spot size and increased throughput efficiencies. Such devices can be used in heat assisted magnetic recording heads.

SUMMARY OF THE INVENTION

Recording heads are provided that comprise a magnetic write pole, and a planar waveguide positioned adjacent to the magnetic write pole, the planar waveguide including a first metal layer, a second metal layer, a first optical layer positioned between the first and second metal layers, and means for coupling an electromagnetic wave to the first optical layer at a resonant incident angle.

The means for coupling an electromagnetic wave to the first optical layer at a resonant incident angle can comprise a second optical layer positioned adjacent to a surface of the second metal layer opposite the first optical layer.

Means can be provided for confining the electromagnetic wave in a direction parallel to the plane of the first optical layer. The means for confining the electromagnetic wave in a direction parallel to the plane of the first optical layer can include a solid immersion lens and/or an aperture formed in an opaque layer at an end of the first optical layer. The first optical layer can include a tapered portion adjacent to an end to concentrate the transmitted light.

The invention also encompasses a recording head comprising a magnetic write pole, and a planar waveguide positioned adjacent to the magnetic write pole, the planar waveguide including a first metal layer, a second metal layer, a first optical layer positioned between the first and second metal layers, and a grating positioned on a surface of the first metal layer for coupling an electromagnetic wave into the first optical layer.

In another aspect, the invention encompasses a disc drive comprising means for rotating a storage medium, and means for positioning a recording head adjacent to a surface of the storage medium, wherein the recording head comprises a magnetic write pole and a planar waveguide positioned adjacent to the magnetic write pole, the planar waveguide including a first metal layer, a second metal layer, a first optical layer positioned between the first and second metal layers, and means for coupling an electromagnetic wave to the first optical layer at a resonant incident angle.

The means for coupling an electromagnetic wave to the first optical layer at a resonant incident angle can comprise a second optical layer positioned adjacent to a surface of the second metal layer opposite the first optical layer.

The invention also encompasses a disc drive comprising means for rotating a storage medium, and means for positioning a recording head adjacent to a surface of the storage medium, wherein the recording head comprises a magnetic write pole and a planar waveguide positioned adjacent to the magnetic write pole, the planar waveguide including a first metal layer, a second metal layer, a first optical layer positioned between the first and second metal layers, and a grating positioned on a surface of the first metal layer for coupling an electromagnetic wave into the first optical layer.

The invention further encompasses a method of magnetic recording comprising: creating a surface plasmon wave in a waveguide positioned adjacent to a magnetic recording pole, using the electromagnetic field from the surface plasmon wave to heat a portion of a recording medium, and using magnetic flux from the recording pole to change the magnetization of the portion of the recording medium.

The step of creating a surface plasmon wave in a waveguide can comprise: coupling an electromagnetic wave to a planar waveguide including a first metal layer, a second metal layer, and a first optical layer positioned between the first and second metal layers.

The invention further includes a planar waveguide comprising a first metal layer, a second metal layer, a first optical layer positioned between the first and second metal layers, and means for coupling an electromagnetic wave to the first optical layer at a resonant incident angle.

The means for coupling an electromagnetic wave to the first optical layer at a resonant incident angle can comprise a second optical layer positioned adjacent to a surface of the second metal layer opposite the first optical layer.

DETAILED DESCRIPTION OF THE INVENTION

This invention encompasses optical waveguides that can be used to produce small optical spots and that can be used in magnetic and/or optical recording heads for use with magnetic and/or optical recording media, as well as magnetic and/or optical recording heads that include such devices and disc drives that include the recording heads.

Figure 1:
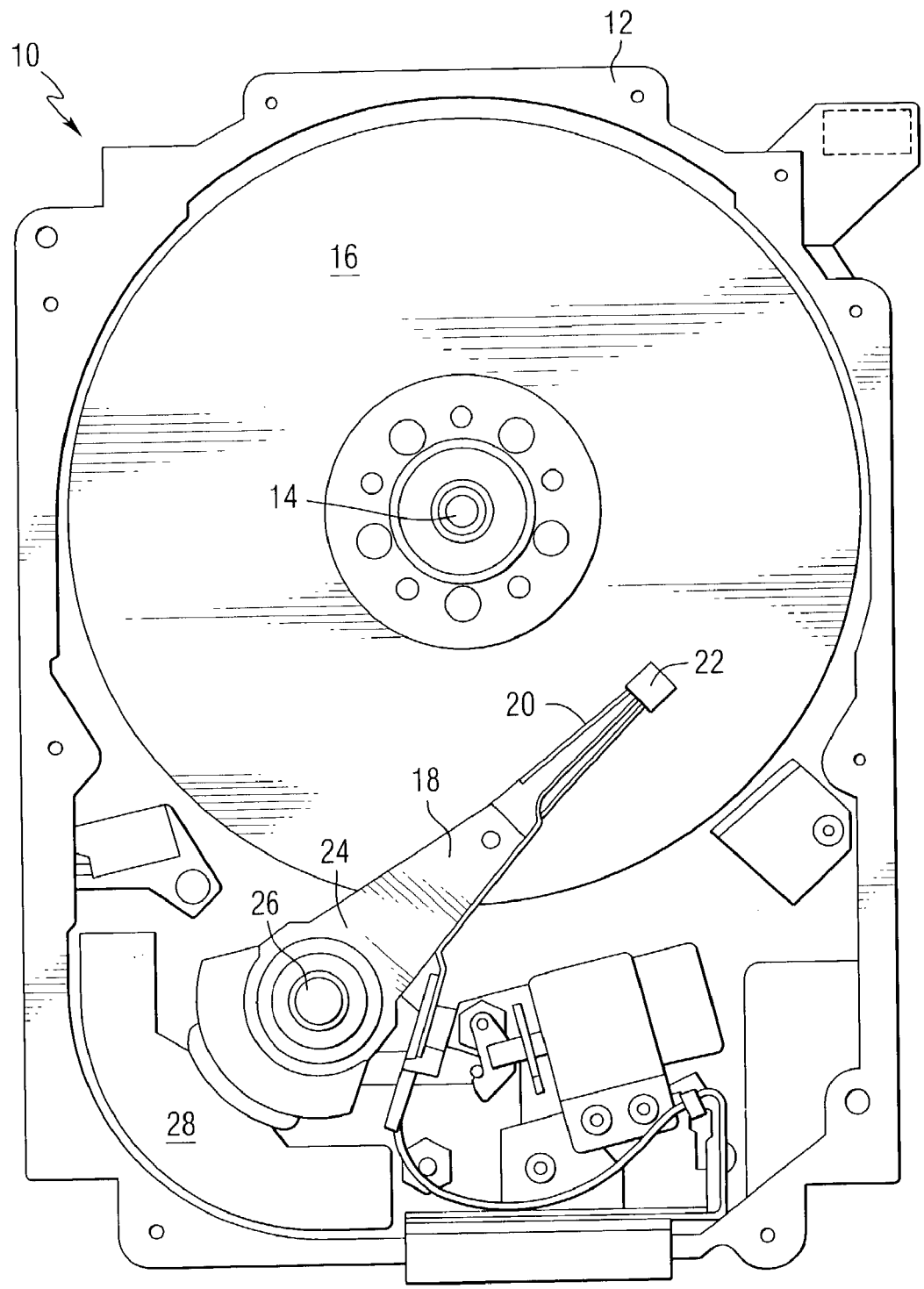
FIG. 1 is a pictorial representation of a magnetic disc drive that can include magnetic heads constructed in accordance with this invention.

FIG. 1 is a pictorial representation of a disc drive 10 that can utilize heat assisted magnetic recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well known in the art.

For heat assisted magnetic recording, electromagnetic radiation (typically light) is used to heat a portion of a surface of a magnetic storage medium. This facilitates the subsequent recording of magnetic information in the heated portion of the medium. Heat assisted magnetic recording heads include means for directing electromagnetic radiation onto the surface of the storage medium, and an associated means for producing a magnetic signal for affecting the magnetization of the storage medium.

Multilayer planar waveguide thin film stacks can be designed to confine light in a first dimension down to tens of nanometers. They are also able to be efficiently excited. To be useful for HAMR an additional mechanism for light confinement is necessary in a second dimension perpendicular to the first dimension. A combination of planar solid immersion lenses and apertures added to the planar waveguide can be used to confine the light in the second dimension.

Figure 2:
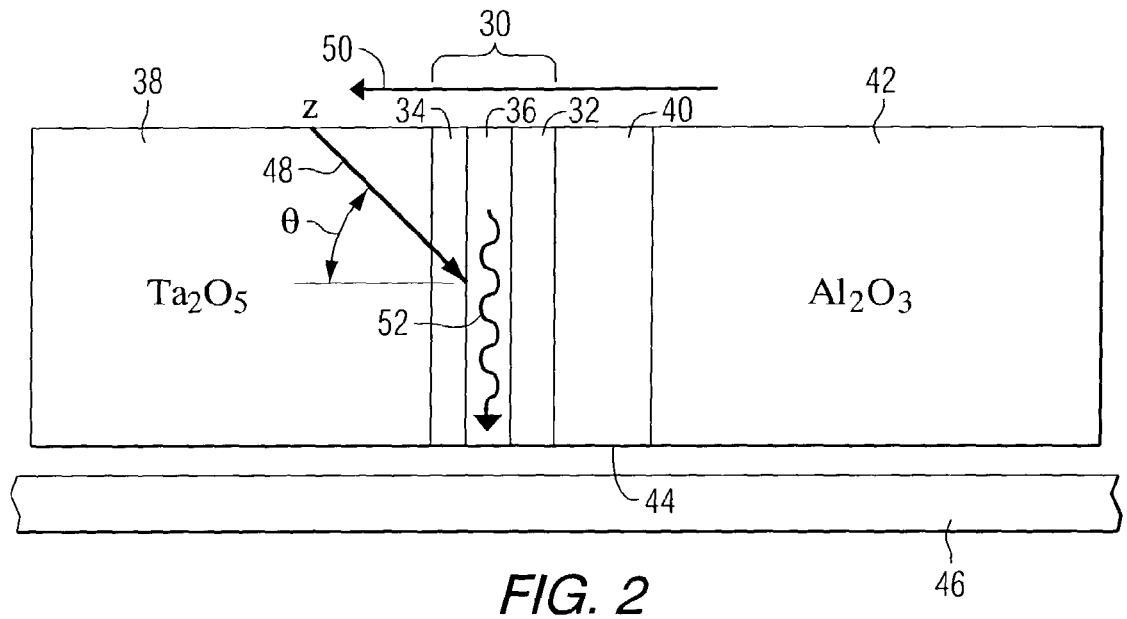
FIG. 2 is a schematic representation of a portion of a heat assisted magnetic recording head constructed in accordance with the invention.

A cross section of a thin film stack and a portion of an associated magnetic recording head is shown in FIG. 2. The thin film stack 30 includes a first metal layer 32, a second metal layer 34, and a first optical layer 36 positioned between the first and second metal layers. A second optical layer 38 is positioned adjacent to a surface of the second metal layer opposite to the first optical layer. The thin film stack is mounted on a surface of a magnetic pole piece 40, which in turn is supported by a substrate 42. The magnetic pole piece 40 is a component of an associated magnetic recording head, and serves to produce a magnetic field at an air bearing surface 44 that is used to affect the magnetization of an adjacent magnetic storage medium 46.

The dielectric 38/metal 34/dielectric 36 film stack is similar to that used in the conventional Kretschmann technique for exciting surface plasmons. Dielectric 38 has a relatively large index of refraction and dielectric 36 has a low index of refraction. The ratio of these indices of refraction is directly related to the angle of the incident light in dielectric 38 that is necessary for exciting the surface plasmon. The angle $\theta$ in FIG. 2 approaches 90° as the index of dielectric 36 approaches the index of dielectric 38. Metal 34 is chosen to have a large conductivity at the operating wavelength and to be approximately one skin depth thick. Metal 32 is also chosen to have a very high conductivity and a very short skin depth. The purpose of metal 32 is to shield the electromagnetic fields of the surface plasmon from the lossy magnetic pole piece. Metal 32 also forms a cavity with metal 34 that supports the propagation of the surface plasmon along the surface of the two metals and within the dielectric 36. Metals 32 and 34 are also designed to confine the electromagnetic field of the surface plasmon and the propagating electromagnetic energy to primarily the space between the metal films. The exact thicknesses of the films are adjusted to maximize the field amplitude of the surface plasmon and the coupling efficiency of the incident electromagnetic wave into the surface plasmon.

In one example, the substrate can be $Al_2O_3$, the magnetic pole piece can be Co, the first metal layer can be Ag, the second metal layer can be Al, the first optical layer can be $MgF_2$, and the second optical layer can be $Ta_2O_5$. An electromagnetic wave from an external source, such as a laser, must be coupled to the first optical layer to produce a surface plasmon wave within the first optical layer. The electromagnetic wave illustrated by arrow 48 is coupled to the second optical layer, for example using a grating, and passes through the second metal layer to strike the first optical layer at an angle of incidence $\theta$ with respect to the z direction as indicated by arrow 50. This creates a surface plasmon wave within the first optical layer as illustrated by arrow 52. The surface plasmon wave then produces an electromagnetic wave at the air bearing surface edge of the first optical layer that is used to heat a portion of the surface of the magnetic storage medium.

Figure 3:
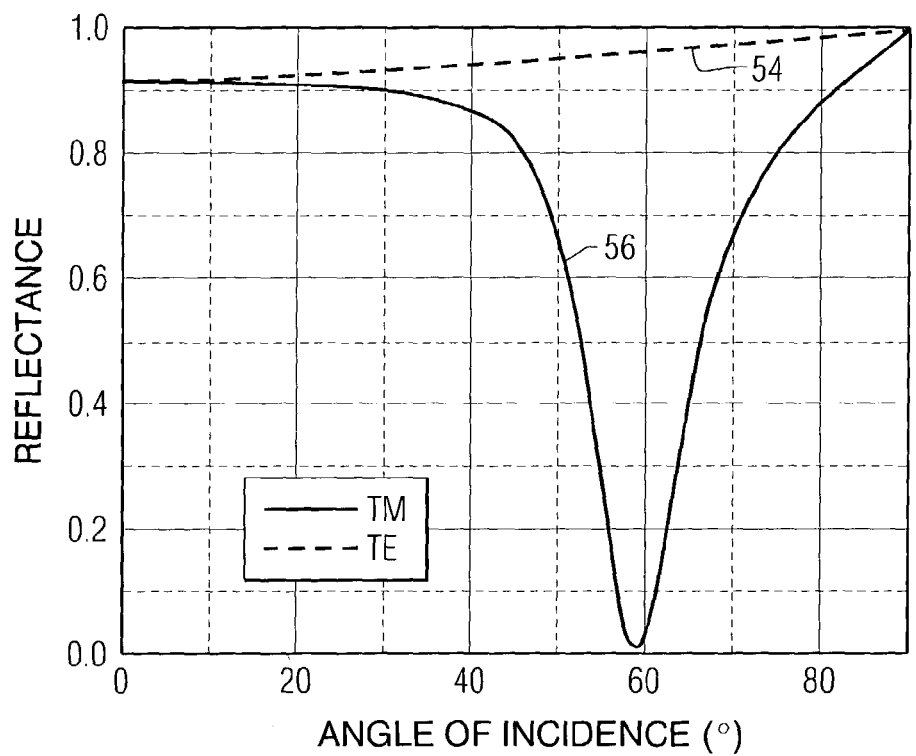
FIG. 3 is a graph of reflectance versus angle of incidence.

The reflectance at a wavelength of 633 nm as a function of angle of incidence for the film stack of FIG. 2 for light incident from the $Ta_2O_5$ film side is shown in FIG. 3. The refractive indices for each layer are 2.4 for the $Ta_2O_5$, $0.135+i(3.99)$ for the Ag, 1.38 for the $MgF_2$, $1.36+i(7.59)$ for the Al, $2.21+i(4.01)$ for the Co, and 1.7 for the $Al_2O_3$.

In FIG. 3, line 54 represents the reflectance for TE polarization and line 56 represents reflectance for TM polarization. From FIG. 3, it can be seen that at an angle of 59° the reflectance nearly vanishes for the TM polarization. At this angle the incident light is almost entirely converted into a surface plasmon wave propagating between the two metal films. The field amplitude through the cross section defined to be the z-axis of the film stack is shown in FIG. 4.

Figure 4:
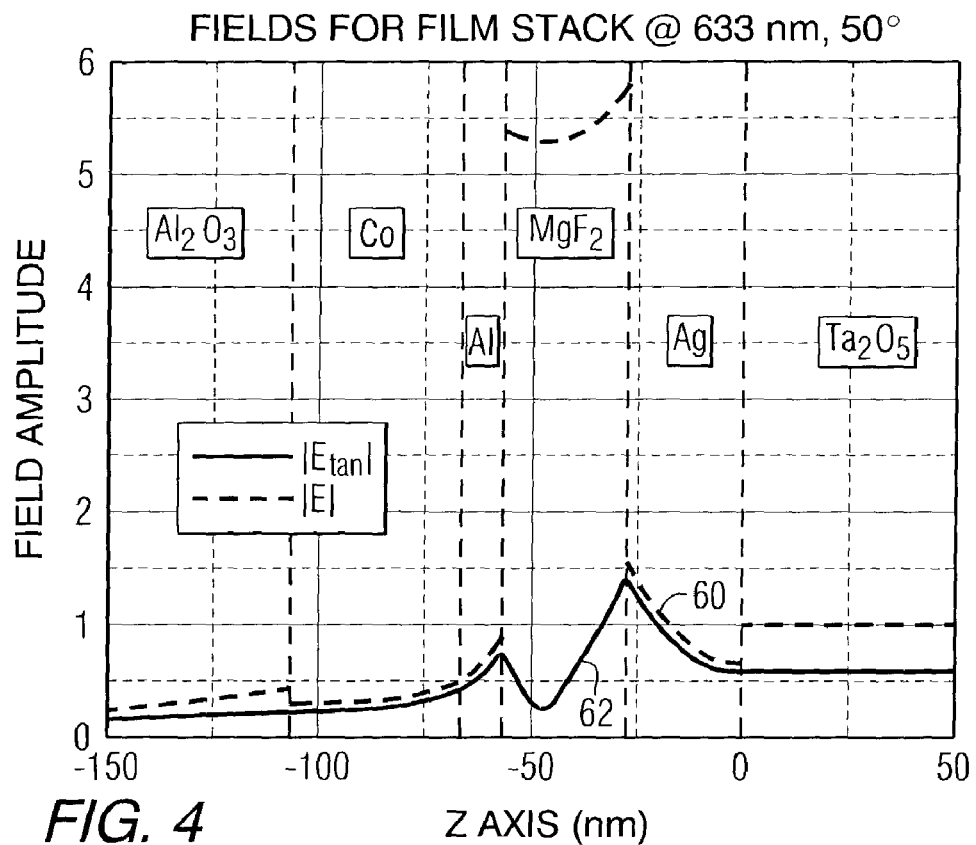
FIG. 4 is a graph of field amplitude along a z-axis.

In FIG. 4, the total field, shown as dotted line 60, is very large within the 30 nm $MgF_2$ layer between the Ag and Al films and is relatively small elsewhere. The tangential component of the field, which must be continuous across the boundaries, is shown as solid line 62.

This example illustrates three features that are included in heat assisted magnetic recording heads constructed in accordance with this invention: 1) a highly efficient technique for converting incident optical energy into a planar waveguide mode, evidenced by the deep reflectance reduction at the resonant angle of incidence, 2) tight subwavelength confinement of the propagating wave within one layer (the $MgF_2$) of the film stack, and 3) a recording pole layer (in the example of FIG. 2, it is the Co layer) adjacent to the film stack that nevertheless does not significantly interfere with the operation of the first two features of the planar waveguide.

Devices constructed in accordance with this invention include a trilayer film stack composed of a high index dielectric/highly conducting metal film/low index dielectric. A surface plasmon mode can be launched in this type of stack using the well known Kretschman technique. In general the metal film is chosen to be silver or gold, although other metals like copper and aluminum may also be used. The thickness of the metal film is typically about one skin depth, but should be optimized either experimentally or theoretically in the final film stack design for minimum reflectance at the resonant angle. In the example of FIG. 2, the optical layer 36 is considered to be the low refractive index material and optical layer 38 is considered to be the high refractive index material. The thickness of the high index dielectric material is arbitrary, and the thickness of the low index dielectric material is chosen to be the desired light confinement width. The refractive index of the low index dielectric material must be substantially less than that of the high index layer because the resonant angle of excitation is generally somewhat larger than the critical angle, q, given by $\sin q = n_l/n_h$, where $n_l$ is the index of refraction of the low index dielectric material and $n_h$ is the index of refraction of the high index dielectric material. If $n_h$ is too close to $n_l$ then the resonant angle approaches 90° and the angular width of the resonance broadens substantially indicating that energy in the surface plasmon is being dissipated to a greater extent within the metallic thin films. The surface plasmon will not propagate as far and will not deliver as much energy to the recording medium. In general, for ease in exciting the surface plasmon and for coupling the most energy into the recording medium, it is preferable to choose refractive indices that give a resonant angle between 10° and 70°. The metal film 32 on the opposite side of the low index dielectric material is used to shield the fields of the propagating mode from the lossy recording pole. This metal film should be very thin, however, so that the light emitted from the low index dielectric material is positioned as close as possible to the field from the recording pole. Therefore, highly conducting metals with a very small skin depth are desired. Aluminum is a good choice for this layer, although gold, silver and copper are other possibilities. The recording pole material is the next layer. Its thickness is arbitrary. Because the field is substantially reduced in amplitude on the other side of the recording pole, the material on the other side of the recording pole is arbitrary. As a second example, we consider the case of a $Ta_2O_5$/gold/$MgF_2$/Al/Co/$Al_2O_3$ film stack at a wavelength of 1550 nm. The resonant angle is 67° for this film stack. The refractive index for $Ta_2O_5$ is 2.4, for gold is 0.559+i(9.81), for $MgF_2$ is 1.38, for Al is 1.44+i(16.0), for Co is 3.56+i(7.14) and for $Al_2O_3$ is 1.7. In one example, the gold is 27 nm thick, the $MgF_2$ is 30 nm thick, the Al is 10 nm thick, and the Co is 50 nm thick.

Figure 5:
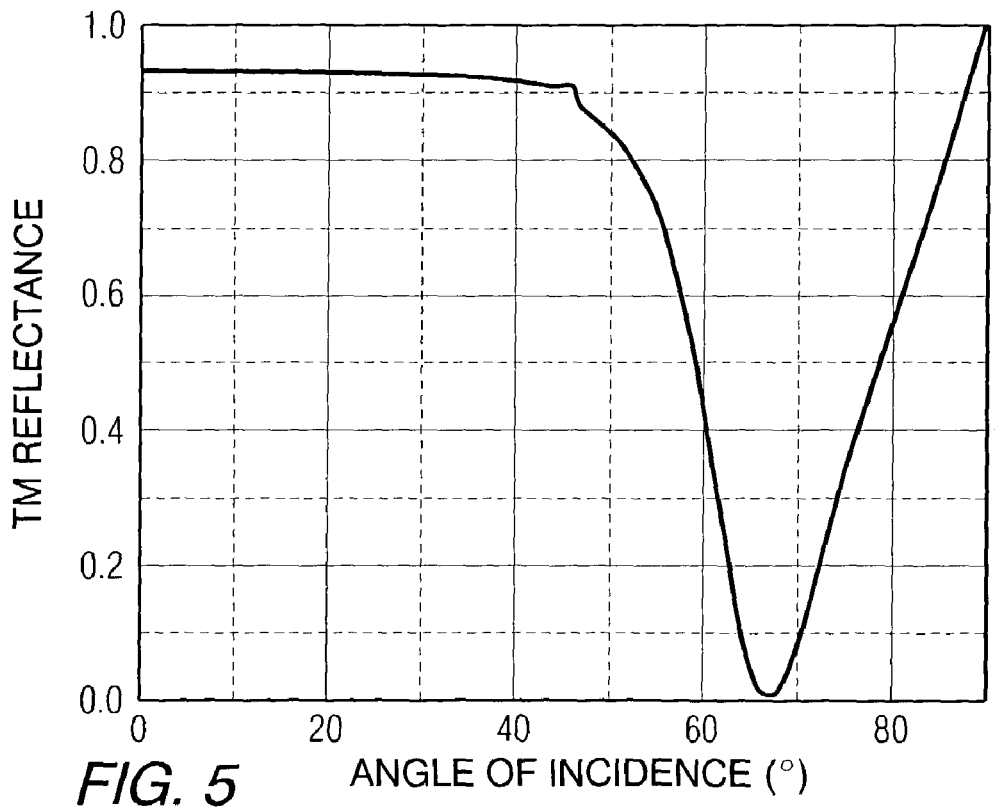
FIG. 5 is a graph of reflectance versus angle of incidence.
Figure 6:
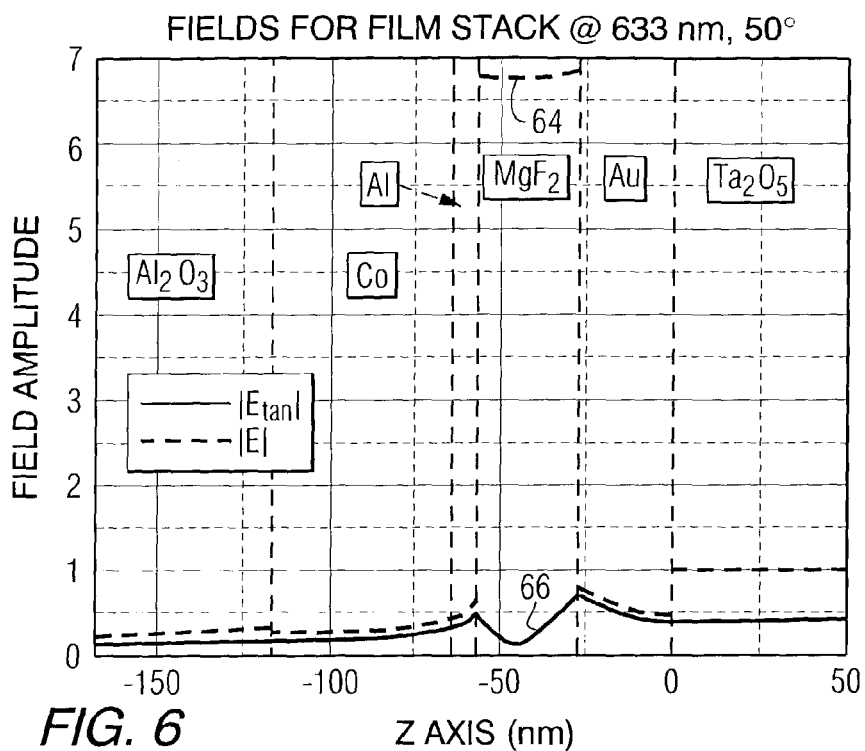
FIG. 6 is a graph of field amplitude along a z-axis.

The reflectance of the TM polarized wave vs. angle of incidence is shown in FIG. 5. The electric field amplitude through the cross section of the film stack, defined to be the z-axis, is shown in FIG. 6. In FIG. 6, dotted line 64 represents the total electric field and solid line 66 represents the tangential electric field. Again, the field amplitude within the low index dielectric is very large and well confined.

In general, it is found that the propagation length of the surface plasmon in this structure is longer for longer wavelengths of the surface plasmon wave (where the metallic conducting properties of the metal films are significantly better) and for lower refractive indices of the low index dielectric layer.

Although the structure of FIG. 2 allows one to efficiently couple light into a well-confined propagating mode, the decay length of this mode can be very short depending upon the amount of confinement. For a propagating mode confined to less than 50 nm, the decay length is usually about 5 to 20 microns. However, for efficiently exciting this mode, the incident collimated light beam is generally greater than 50 microns in cross-sectional diameter. Therefore, to obtain the most energy in this propagating mode, the film stack may also be designed to have a thicker low index dielectric layer with a much longer decay length where the light is incident upon the film stack.

Figure 7:
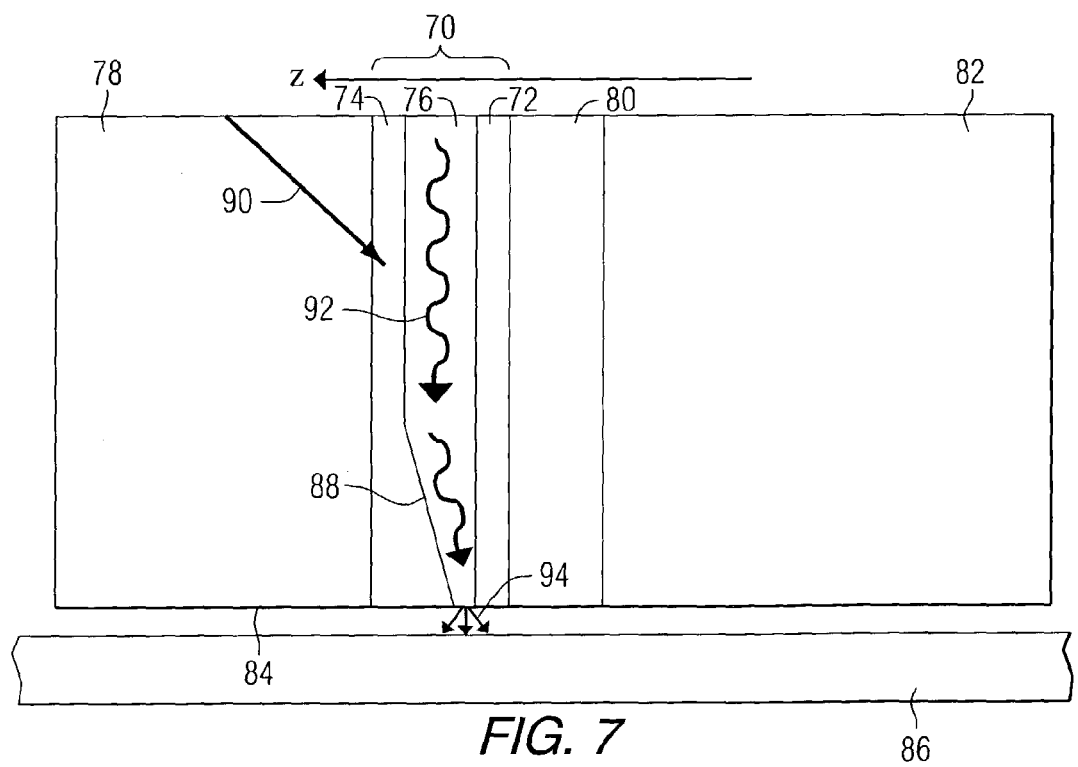
FIG. 7 is a schematic representation of a portion of another heat assisted magnetic recording head constructed in accordance with the invention.

FIG. 7 is a schematic representation of a portion of another heat assisted magnetic recording head constructed in accordance with the invention. The structure of FIG. 7 includes a thin film stack 70 including a first metal layer 72, a second metal layer 74, and a first optical layer 76 positioned between the first and second metal layers. A second optical layer 78 is positioned adjacent to a surface of the second metal layer opposite to the first optical layer. The thin film stack is mounted on a surface of a magnetic pole piece 80, which in turn is supported by a substrate 82. The magnetic pole piece 80 is a component of an associated magnetic recording head, and serves to produce a magnetic field at an air bearing surface 84 that is used to affect the magnetization of an adjacent magnetic storage medium 86. The low index dielectric layer includes a tapered portion 88 having a cross-sectional area that decreases to the desired light confinement dimensions. Light supplied by an external source enters optical layer 78 as shown by arrow 90 and excites a plasmon wave 92 in optical layer 76. The plasmon wave travels through the tapered portion 88 and emits an electromagnetic wave as illustrated by arrows 94 at the air bearing surface.

Figure 8:
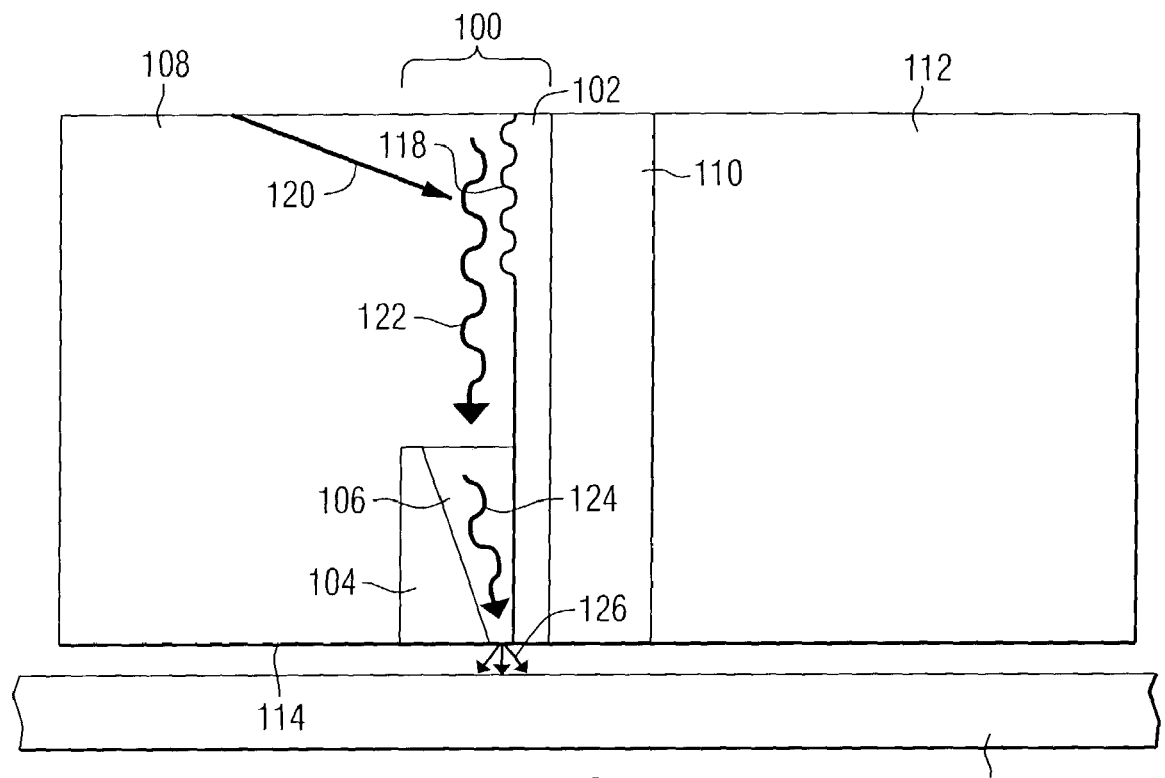
FIG. 8 is a schematic representation of a portion of another heat assisted magnetic recording head constructed in accordance with the invention.

Rather than using a Kretschman technique for launching the surface plasmon, a diffraction grating may also be used. The thin film stack can be designed as shown in FIG. 8. The structure of FIG. 8 includes a thin film stack 100 including a first metal layer 102, a second metal layer 104, and a first optical layer 106 positioned between the first and second metal layers. A second optical layer 108 is positioned adjacent to a surface of the second metal layer opposite to the first optical layer and is also in contact with the first metal layer. The thin film stack is mounted on a surface of a magnetic pole piece 110, which in turn is supported by a substrate 112. The magnetic pole piece 110 is a component of an associated magnetic recording head, and serves to produce a magnetic field at an air bearing surface 114 that is used to affect the magnetization of an adjacent magnetic storage medium 116. The low index dielectric layer includes a tapered portion having a cross-sectional area that decreases to the desired light confinement dimensions.

In the top part of FIG. 8, the light 120 enters through a high index dielectric and strikes a grating 118 in the metallic layer which shields the recording pole. This generates a surface plasmon which propagates down the metallic layer as shown by arrow 122. The surface plasmon enters the tapered optical layer 106 and travels toward the air bearing surface as shown by arrow 124. An electromagnetic wave is emitted at the air bearing surface as illustrated by arrows 126.

Figure 9:
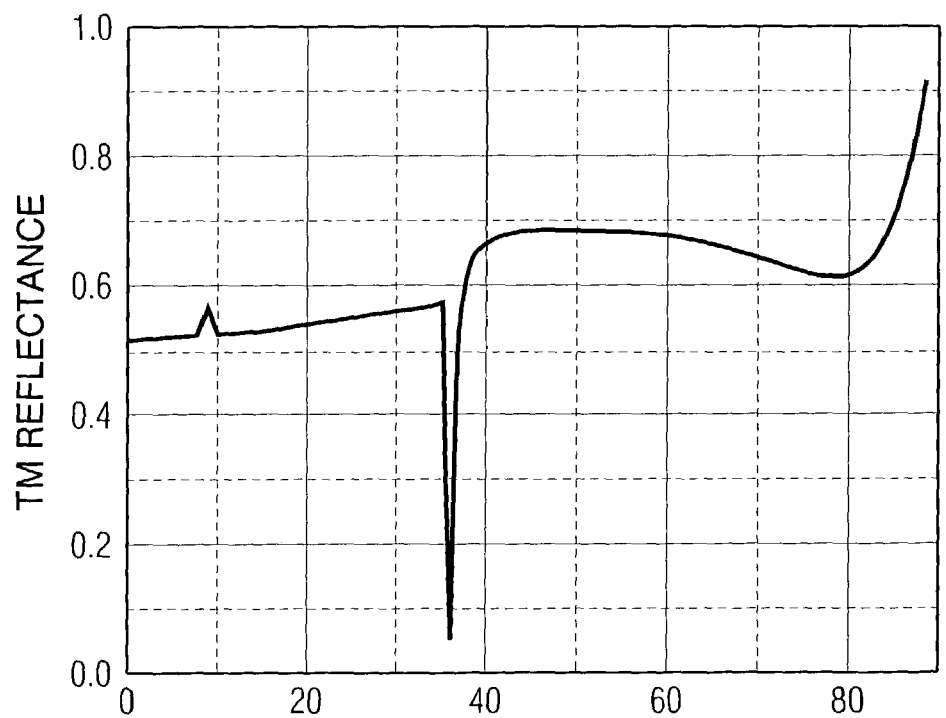
FIG. 9 is a graph of reflectance versus angle of incidence.

The reflectance as a function of angle of incidence is shown in FIG. 9. In this example, the resonant angle occurs at 36°. The resonant angle is easily varied by varying the grating period. The minimum reflectance can be adjusted by the depth of the grooves in the grating.

Figure 10:
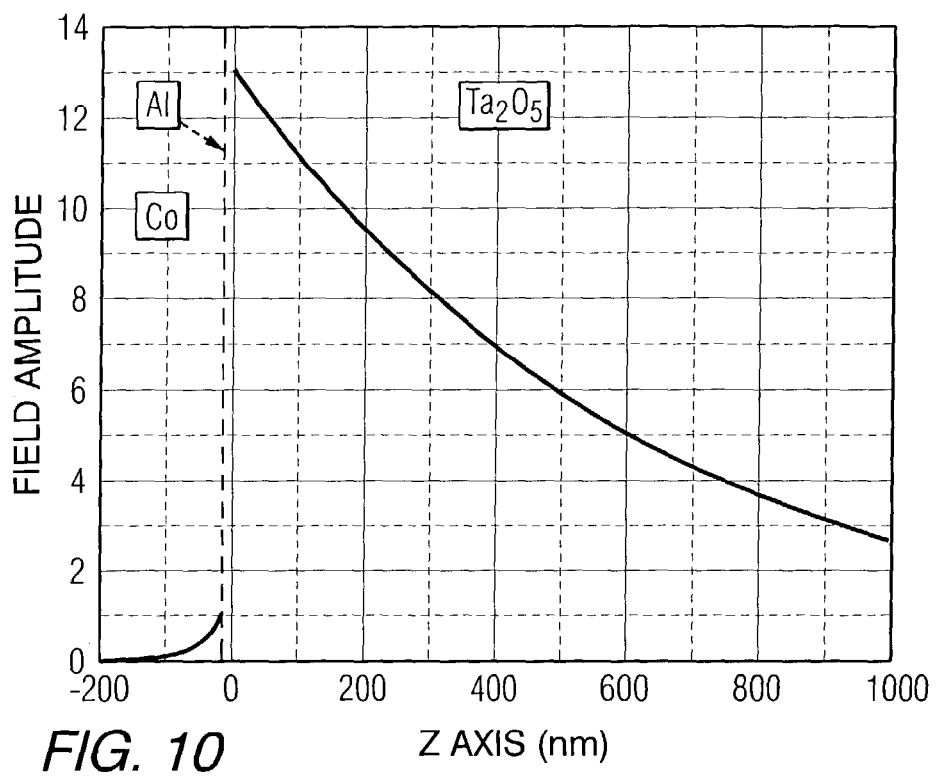
FIG. 10 is a graph of field amplitude along a z-axis.

The field amplitude cross-section along the z-axis at resonance of the propagating surface plasmon is shown in FIG. 10. As shown in FIG. 10, the field from the surface plasmon, extends about one wavelength away from the metal film, so it is not well confined. Therefore, the wedge shaped section of optical layer 106 shown in FIG. 8 can be used to capture the field from the surface plasmon and confine it at the bottom edge of the waveguide as in the example of FIG. 7.

For the example of FIG. 8, the wavelength was 1550 nm, and the grating period was sinusoidal with a period of 1500 nm and a depth of 100 nm. The index for the $Ta_2O_5$ layer was 2.4, for the 15 nm Al layer was 1.44+i(16.0), and for the Co layer was 3.56+i(7.14).

Figure 11:
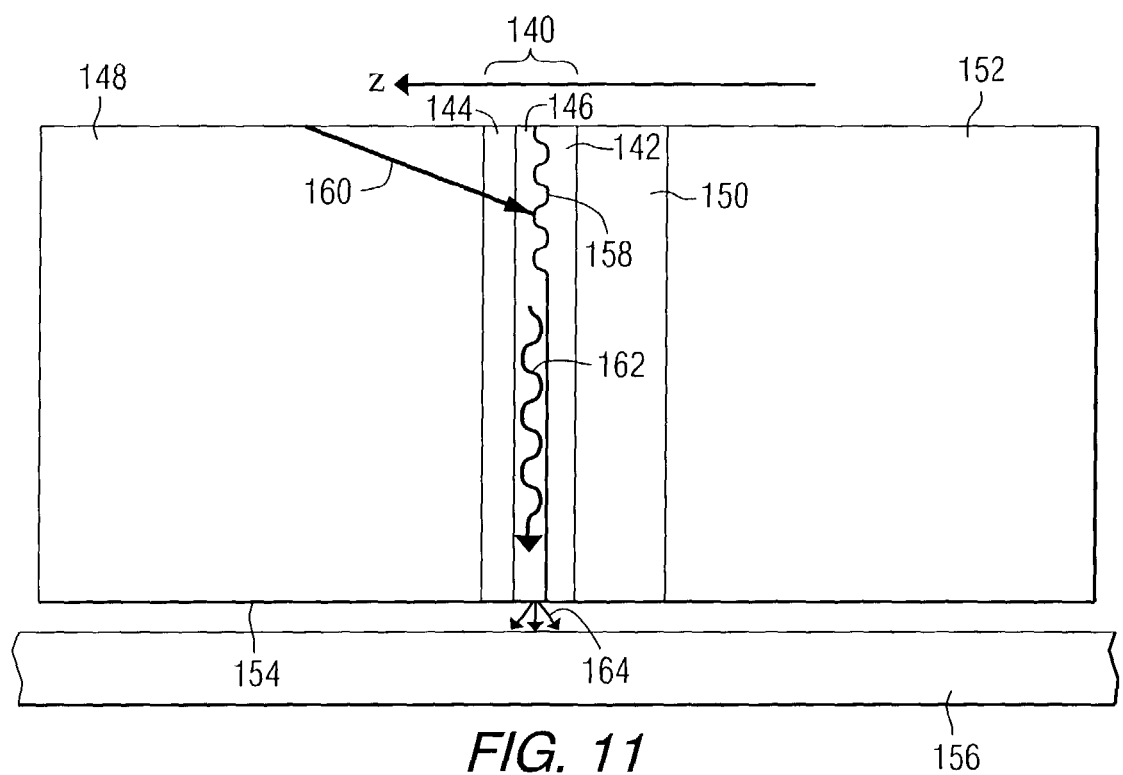
FIG. 11 is a schematic representation of a portion of another heat assisted magnetic recording head constructed in accordance with the invention.

It is also possible to include the grating into the film stack as shown in FIG. 11. The structure of FIG. 11 includes a thin film stack 140 including a first metal layer 142, a second metal layer 144, and a first optical layer 146 positioned between the first and second metal layers. A second optical layer 148 is positioned adjacent to a surface of the second metal layer opposite to the first optical layer. The thin film stack is mounted on a surface of a magnetic pole piece 150, which in turn is supported by a substrate 152. The magnetic pole piece 150 is a component of an associated magnetic recording head, and serves to produce a magnetic field at an air bearing surface 154 that is used to affect the magnetization of an adjacent magnetic storage medium 156. A grating 158 is included in the low index dielectric layer to couple the incident light 160 into the waveguide. The incident light creates surface plasmons in the optical layer 146 which travel toward the air bearing surface as shown by arrow 162. An electromagnetic wave is then emitted at the air bearing surface as illustrated by arrows 164.

Figure 12:
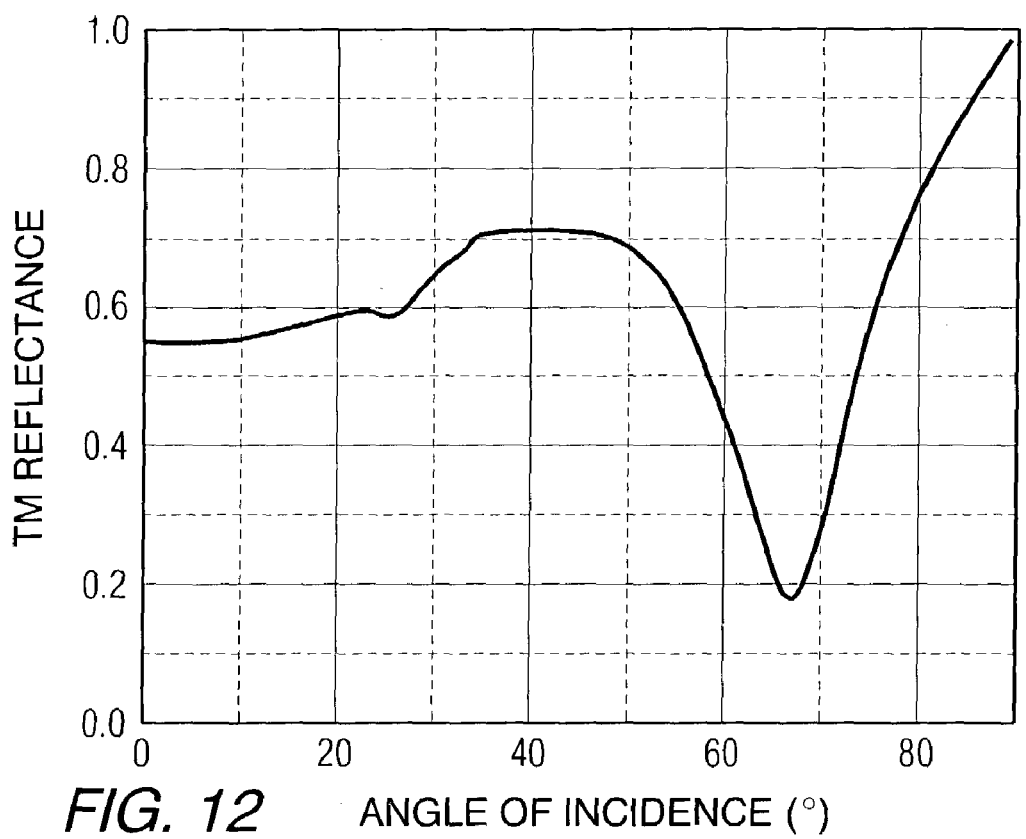
FIG. 12 is a graph of reflectance versus angle of incidence.

The example of FIG. 11 uses the same wavelength (633 nm) and the same materials, $Ta_2O_5/Ag/MgF_2/Al/Co/Al_2O_3$ with the same refractive indices as for the example of FIG. 2. The layer thicknesses are 40 nm for Ag, 30 nm for $MgF_2$, 10 nm for Al, and 50 nm for Co. The grating period is 600 nm and the groove depth is 40 nm. As shown in the graph of reflectance vs. angle of incidence in FIG. 12, a large fraction of the incident energy is absorbed at resonance.

Figure 13:
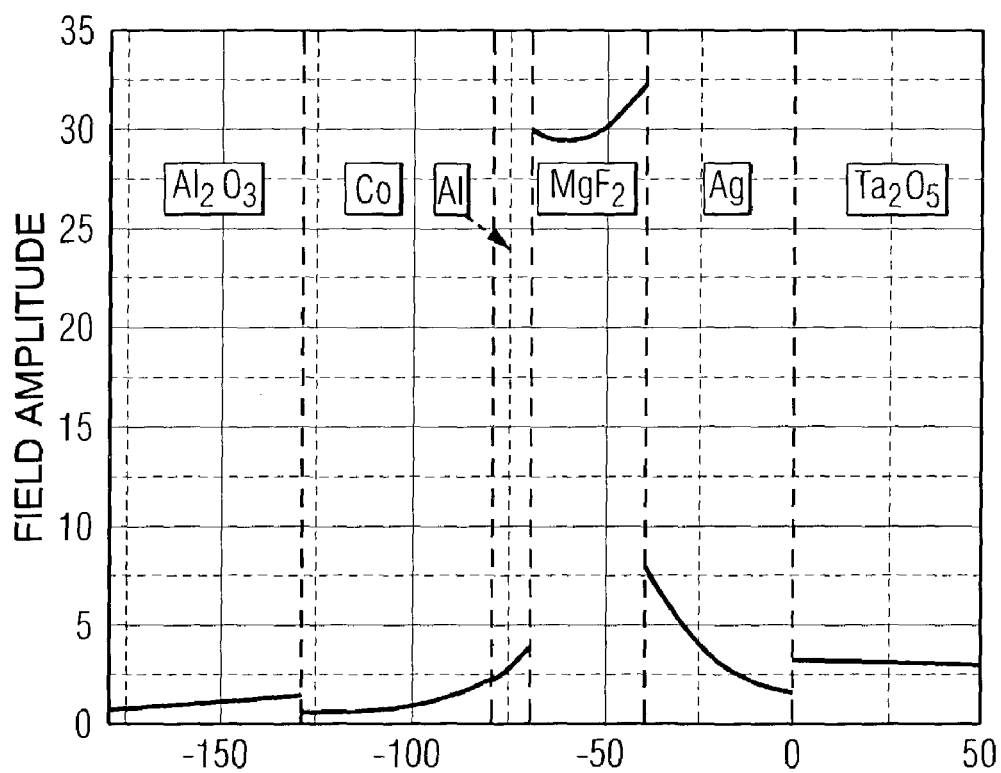
FIG. 13 is a graph of field amplitude along a z-axis.

The cross section of the field amplitude along the z-axis for this resonant mode is shown in FIG. 13. The fields are still tightly confined within the $MgF_2$ layer. Because the resonance at 67° is broader, this mode is more heavily damped and the decay length is shorter.

Figure 14:
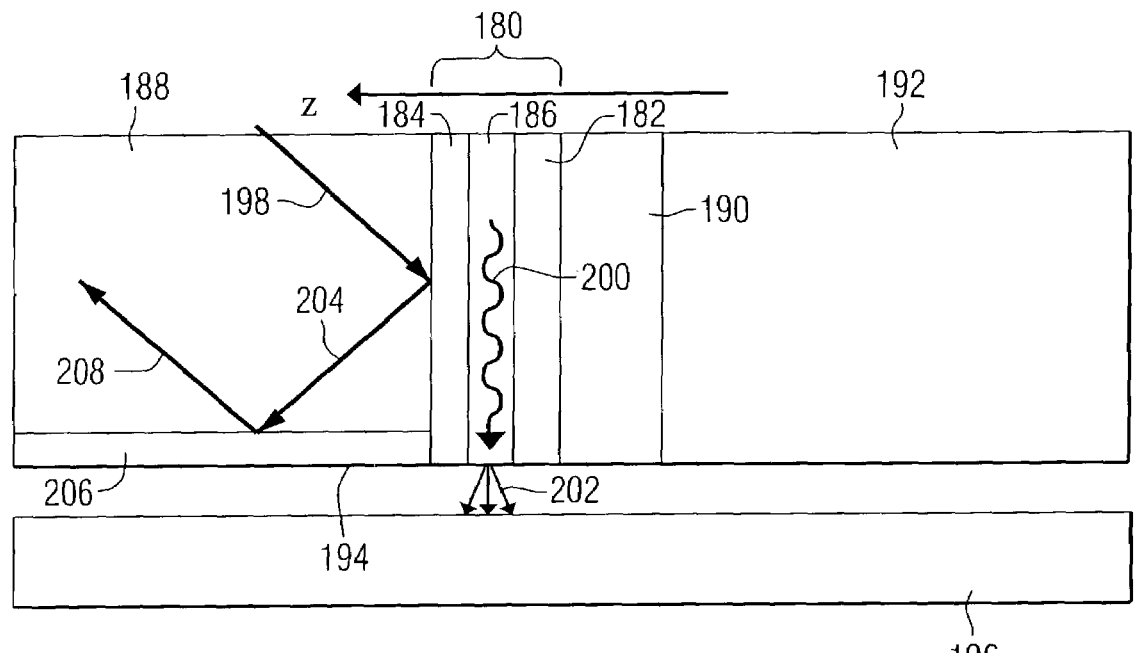
FIG. 14 is a schematic representation of a portion of another heat assisted magnetic recording head constructed in accordance with the invention.

It may be desirable to include a metal shield along the bottom surface of the high index dielectric layer to prevent any reflected light from the incident beam from striking the recording medium as shown in FIG. 14. FIG. 14 is a schematic representation of a portion of another heat assisted magnetic recording head constructed in accordance with the invention. The structure of FIG. 14 includes a thin film stack 180 including a first metal layer 182, a second metal layer 184, and a first optical layer 186 positioned between the first and second metal layers. A second optical layer 188 is positioned adjacent to a surface of the second metal layer opposite to the first optical layer. The thin film stack is mounted on a surface of a magnetic pole piece 190, which in turn is supported by a substrate 192. The magnetic pole piece 190 is a component of an associated magnetic recording head, and serves to produce a magnetic field at an air bearing surface 194 that is used to affect the magnetization of an adjacent magnetic storage medium 196. Incident light enters the structure as shown by arrow 198. The incident light creates surface plasmons in the optical layer 186 which travel toward the air bearing surface as shown by arrow 200. An electromagnetic wave is then emitted at the air bearing surface as illustrated by arrows 202. A portion of the incident light is reflected off of the metal layer 184 as shown by arrow 204. A metal layer 206 can be added to the bottom of layer 188 to reflect the light away from the air bearing surface as shown by arrow 208.

Figure 15:
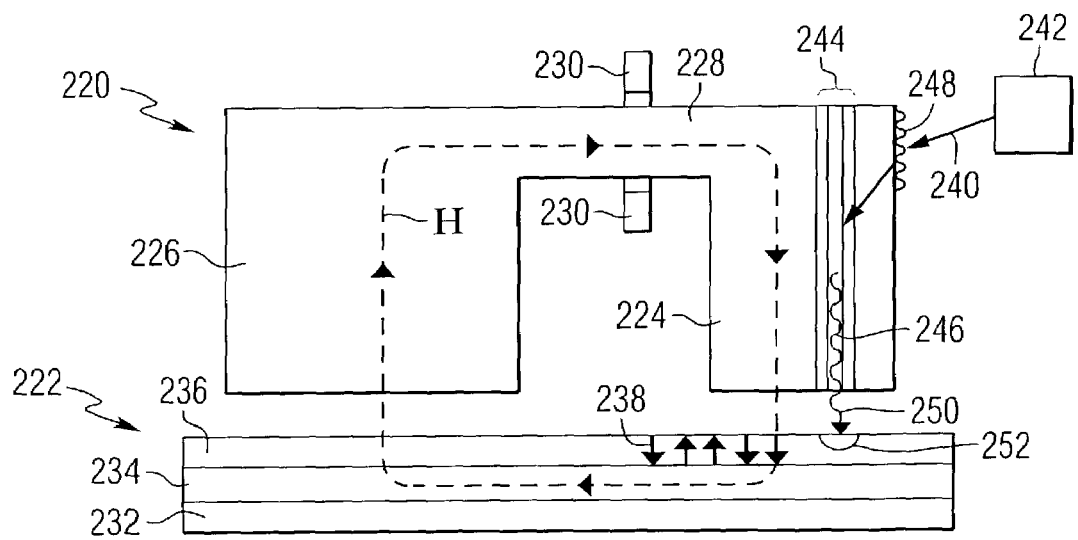
FIG. 15 is a schematic representation of a heat assisted magnetic recording head constructed in accordance with the invention.

FIG. 15 is a partially schematic side view of a heat assisted magnetic recording head 220 and a magnetic recording medium 222. Although an embodiment of the invention is described herein with reference to recording head 220 as a perpendicular magnetic recording head and the medium 222 as a perpendicular magnetic recording medium, it will be appreciated that aspects of the invention may also be used in conjunction with other types of recording heads and/or recording mediums where it may be desirable to employ heat assisted recording. Specifically, the recording head 220 may include a writer section comprising a main write pole 224 and a return or opposing pole 226 that are magnetically coupled by a yoke or pedestal 228. It will be appreciated that the recording head 220 may be constructed with a write pole 224 only and no return pole 226 or yoke 228. A magnetization coil 230 surrounds the yoke or pedestal 228 for energizing the recording head 220. The recording head 220 also may include a read head, not shown, which may be any conventional type read head as is generally known in the art.

Still referring to FIG. 15, the recording medium 222 is positioned adjacent to or under the recording head 220. The recording medium 222 includes a substrate 232, which may be made of any suitable material such as ceramic glass or amorphous glass. A soft magnetic underlayer 234 is deposited on the substrate 232. The soft magnetic underlayer 234 may be made of any suitable material such as, for example, alloys or multilayers having Co, Fe, Ni, Pd, Pt or Ru. A hard magnetic recording layer 236 is deposited on the soft underlayer 234, with the perpendicular oriented magnetic domains 238 contained in the hard layer 236. Suitable hard magnetic materials for the hard magnetic recording layer 236 may include at least one material selected from, for example, FePt or CoCrPt alloys having a relatively high anisotropy at ambient temperature.

The recording head 220 also includes means for providing an electromagnetic wave 240 in the form of a light source 242 and a planar waveguide structure 244 to heat the magnetic recording medium 222 proximate to where the write pole 224 applies the magnetic write field H to the recording medium 222. Specifically, the planar waveguide may include any of the examples shown in FIG. 2, 7, 8, 11 or 14. The optical waveguide 244 acts in association with a light source 242 which transmits light, for example via an optical fiber that is in optical communication with the optical waveguide 244. The light source 242 may be, for example, a laser diode, or other suitable laser light sources. This provides for the generation of a guided mode that may propagate through the optical waveguide 244 as illustrated by arrow 246. A grating 248 can be used to couple the light to the waveguide. EM radiation, generally designated by reference number 250, is transmitted from the waveguide to heat the recording medium 222, and particularly for heating a localized area 252 of the recording layer 236.

Figure 16:
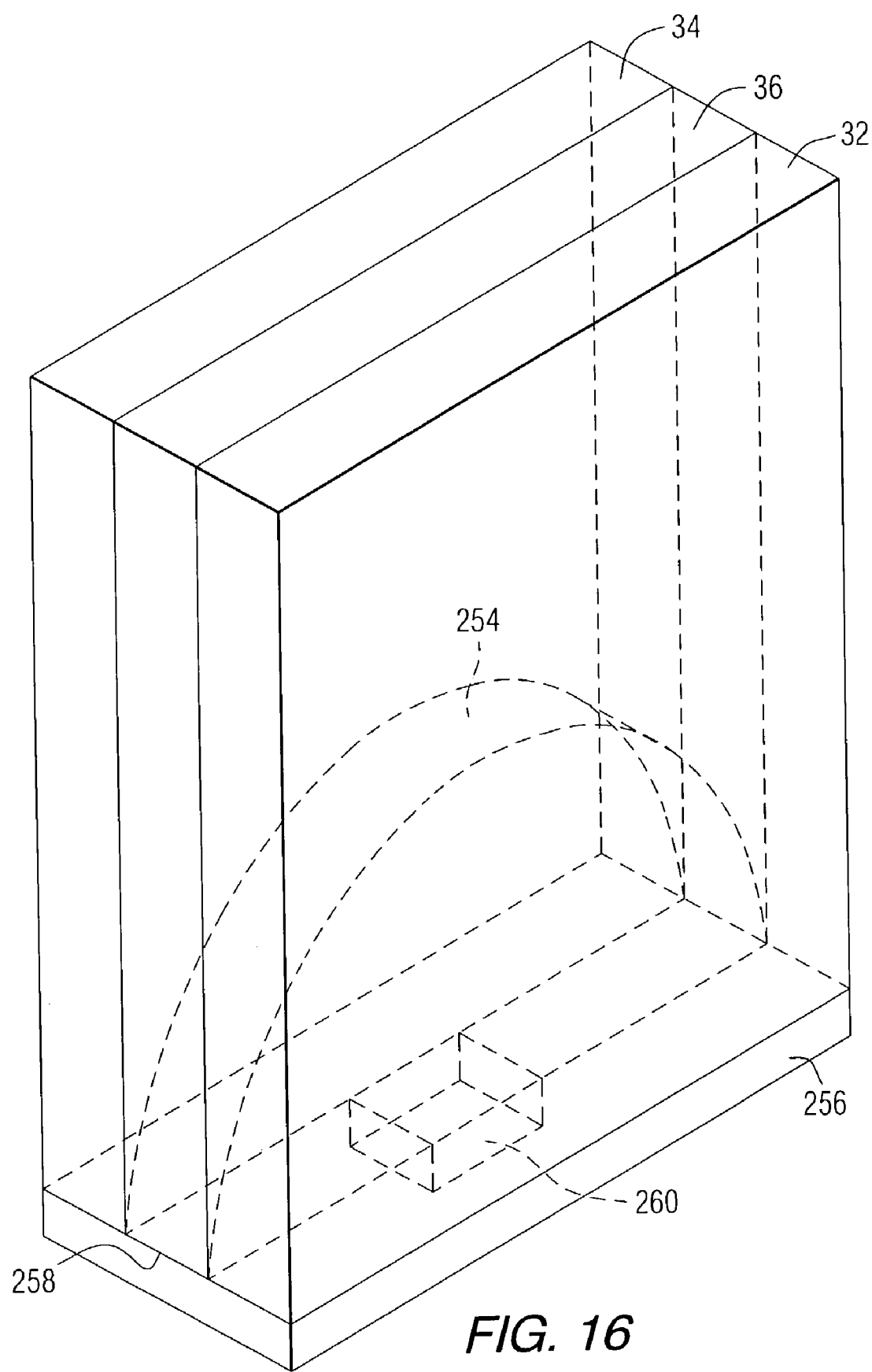
FIG. 16 is a schematic representation of another waveguide constructed in accordance with the invention.
Figure 17:
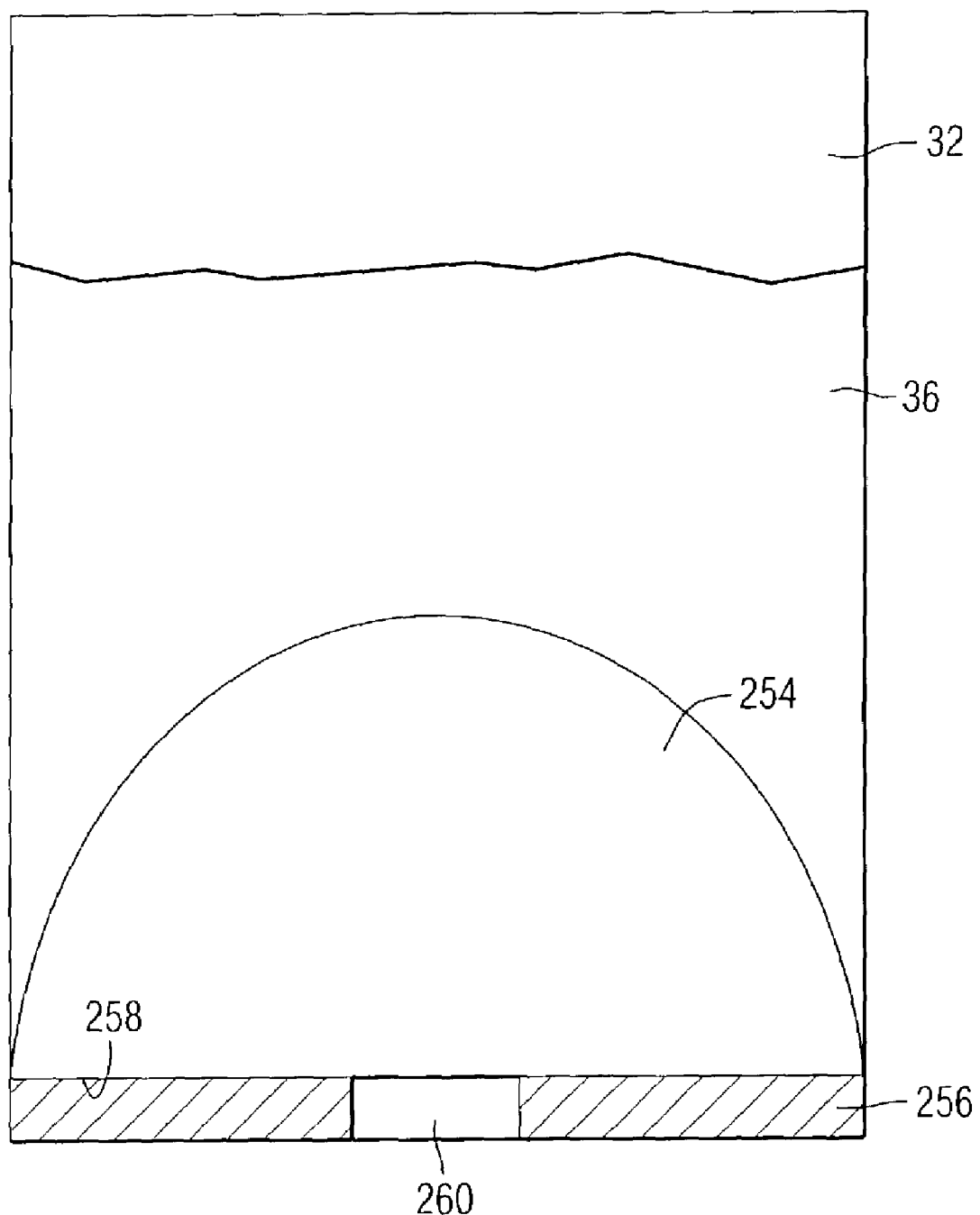
FIG. 17 is a cross-sectional view of the waveguide of FIG. 16.

FIG. 16 is a schematic representation of another waveguide constructed in accordance with the invention, and FIG. 17 is a cross-sectional view of the waveguide of FIG. 16. FIGS. 16 and 17 show the addition of a planar mode index lens 254 that can be positioned in the first optical layer 36 of FIG. 2, and can serve as a means for confining the electromagnetic wave in a direction parallel to the plane of the first optical layer. An opaque metallic layer 256 can be applied to a first end 258 of the optical layer and can define an aperture 260. The bottom surface of the mode index lens can be coincident with the bottom surface of the waveguide to form a planar solid immersion lens. Alternatively, the mode index lens can be positioned higher up in the waveguide.

While the present invention has been described in terms of several examples, it will be apparent to those skilled in the art that various changes can be made to the disclosed examples without departing from the scope of the invention as defined by the following claims.

What is claimed is:

1. A recording head comprising:
   a magnetic write pole; and
   a planar waveguide positioned adjacent to the magnetic write pole, the planar waveguide including a first metal layer, a second metal layer, a first optical layer positioned between the first and second metal layers, and a second optical layer positioned adjacent to a surface of the second metal layer opposite the first optical layer.

2. A recording head according to claim 1, wherein the second optical layers couples an electromagnetic wave to the first optical layer at a resonant incident angle.

3. A recording head according to claim 1, further comprising a mode index lens positioned within the first optical layer.

4. A recording head according to claim 1, further comprising an opaque layer positioned at an end of the first optical layer and defining an aperture.

5. A recording head according to claim 1, wherein the first optical layer includes a tapered portion adjacent to an end of the first optical layer.

6. A recording head comprising:
a magnetic write pole; and
a planar waveguide positioned adjacent to the magnetic write pole, the planar waveguide including a first metal layer, a second metal layer, a first optical layer positioned between the first and second metal layers, and a grating positioned on a surface of the first metal layer for coupling an electromagnetic wave into the first optical layer.

7. A recording head according to claim 6, further comprising a second optical layer positioned adjacent to a surface of the second metal layer opposite the first optical layer.

8. A recording head according to claim 6, further comprising a mode index lens positioned within the first optical layer.

9. A recording head according to claim 6, further comprising an opaque layer positioned at an end of the first optical layer and defining an aperture.

10. A recording head according to claim 6, wherein the first optical layer includes a tapered portion adjacent to an end of the first optical layer.

11. A disc drive comprising:
a motor for rotating a storage medium; and
an arm for positioning a recording head adjacent to a surface of the storage medium;
wherein the recording head comprises a magnetic write pole and a planar waveguide positioned adjacent to the magnetic write pole, the planar waveguide including a first metal layer, a second metal layer, a first optical layer positioned between the first and second metal layers, and a second optical layer positioned adjacent to a surface of the second metal layer opposite the first optical layer.

12. A disc drive according to claim 11, wherein the second optical layer couples an electromagnetic wave to the first optical layer at a resonant incident angle.

13. A disc drive according to claim 11, futher cormprising a mode index lens positioned within the first optical layer.

14. A disc drive according to claim 11, further comprising an opaque layer positioned at an end of the first optical layer and defining an aperture.

15. A disc drive according to claim 11, wherein the first optical layer includes a tapered portion adjacent to an end of the first optical layer.

16. A disc drive comprising:
a motor for rotating a storage medium; and
an arm for positioning a recording head adjacent to a surface of the storage medium;
wherein the recording head comprises a magnetic write pole and a planar waveguide positioned adjacent to the magnetic write pole, the planar waveguide including a first metal layer, a second metal layer, a first optical layer positioned between the first and second metal layers, and a grating positioned on a surface of the first metal layer for coupling an electromagnetic wave into the first optical layer.

17. A disc drive according to claim 16, further comprising a second optical layer positioned adjacent to a surface of the second metal layer opposite the first optical layer.

18. A disc drive according to claim 16, further comprising a mode index lens positioned within the first optical layer.

19. A disc drive according to claim 16 further comprising an opaque layer positioned at an end of the first optical layer and defining an aperture.

20. A disc drive according to claim 16, wherein the first optical layer includes a tapered portion adjacent to an end of the first optical layer.

21. A method of magnetic recording comprising:
creating a surface plasmon wave in a waveguide positioned adjacent to a magnetic recording pole;
using the electromagnetic fields from the surface plasmon wave to heat a portion of a recording medium; and
using magnetic flux from the recording pole to change the magnetization of the portion of the recording medium.

22. The method of claim 21, wherein the step of creating a surface plasmon wave in a waveguide comprises:
coupling an electromagnetic wave to a planar waveguide including a first metal layer, a second metal layer, and a first optical layer positioned between the first and second metal layers.

23. A planar waveguide comprising:
a first metal layer;
a second metal layer;
a first optical layer positioned between the first and second metal layers;
a second optical layer positioned adjacent to a surface of the second metal layer opposite the first optical layer; and
a mode index lens positioned within the first optical layer for confining the electromagnetic wave in a direction parallel to the plane of the first optical layer.

24. A planar waveguide comprising:
a first metal layer;
a second metal layer;
a first optical layer positioned between the first and second metal layers;
a second optical layer positioned adjacent to a surface of the second metal layer opposite the first optical layer; and
an opaque layer positioned at an end of the first optical layer and defining an aperture for confining the electromagnetic wave in a direction parallel to the plane of the first optical layer.

* * * * *